United States Patent
Zheng et al.

(10) Patent No.: US 8,280,451 B1
(45) Date of Patent: Oct. 2, 2012

(54) NOTIFICATION OF EVENT BY MOBILE COMMUNICATIONS DEVICE USING RADIO FREQUENCY TRANSMITTER

(75) Inventors: Lantian Zheng, San Jose, CA (US); Zhi Dennis Weng, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/272,929

(22) Filed: Oct. 13, 2011

Related U.S. Application Data (60) Provisional application No. 61/504,566, filed on Jul. 5, 2011.

(51) Int. Cl.
*H04M 1/00* (2006.01)
(52) U.S. Cl. .................. 455/569.1; 455/456.1; 455/441; 455/445; 455/419; 455/567; 379/88.21
(58) Field of Classification Search ............... 455/456.1, 455/441, 445, 459.1, 567, 419; 379/88.21
See application file for complete search history.

(56) References Cited

U.S. PATENT DOCUMENTS

| | | | | |
|---|---|---|---|---|
| 6,337,972 | B1 * | 1/2002 | Jones et al. ................. | 340/7.57 |
| 2005/0143139 | A1 | 6/2005 | Park et al. | |
| 2006/0099940 | A1 * | 5/2006 | Pfleging et al. ............... | 455/419 |
| 2007/0072616 | A1 * | 3/2007 | Irani ............................. | 455/441 |
| 2008/0171536 | A1 | 7/2008 | Katz | |
| 2008/0192905 | A1 * | 8/2008 | Fujita-Yuhas .............. | 379/88.21 |

OTHER PUBLICATIONS

"Mount, Power, and Play Your iPod in Your Car with the Belkin TuneBase FM for iPod and TuneBase FM for iPod nano," May 8, 2006, Belkin Press Release [online]. First accessed on Sep. 28, 2011. Retrieved from the Internet: <http://www.belkin.com/au/pressroom/releases/uploads/PR%20TuneBase%20FM.htm> (2 pgs.).

\* cited by examiner

*Primary Examiner* — Anthony S Addy
*Assistant Examiner* — Shahriar Behnamian
(74) *Attorney, Agent, or Firm* — Shumaker & Sieffert, P.A.

(57) ABSTRACT

In general, this disclosure describes techniques for alerting a user of a mobile communications device of an event using a radio frequency transmitter. The techniques may include determining that an event has occurred. The event may relate to an incoming communication received by the mobile communications device. The techniques also may include determining that an approximate speed of the mobile communications device exceeds a defined threshold speed. The techniques further may include transmitting, using a radio frequency transmitter, an audible alert that provides notification of the event in response to the mobile communications device determining that the approximate speed exceeds the predefined threshold speed.

17 Claims, 3 Drawing Sheets

NOTIFICATION OF EVENT BY MOBILE COMMUNICATIONS DEVICE USING RADIO FREQUENCY TRANSMITTER

This application claims the benefit of U.S. Provisional Application No. 61/504,566 to Zheng et al., entitled, "NOTIFICATION OF EVENT BY MOBILE COMMUNICATIONS DEVICE USING RADIO FREQUENCY TRANSMITTER" and filed on Jul. 5, 2011. The entire content of U.S. Provisional Application No. 61/504,566 is incorporated herein by reference.

TECHNICAL FIELD

This disclosure relates to providing notifications of events on a mobile communications device.

BACKGROUND

Users of mobile communications devices may, at times, miss communications events received by the mobile communications device, such as a phone call, a voicemail, an e-mail, a short message service (SMS) message, or an instant message. In some cases, the mobile communications device may provide an audible or visual notification of the missed communications event, such as a flashing light emitting diode (LED), a chime or notification sound, or the like. However, in some situations, the user may not wish to or be able to interact with the mobile communications device to see or hear the notification.

SUMMARY

In one example, various aspects of this disclosure are directed to a method performed by a mobile communications device having a processor, memory, a wireless network interface, and a radio frequency transmitter. The method includes determining, by the mobile communications device, that an event has occurred. According to these aspects of the disclosure, the mobile communications device is positioned within a moving vehicle having a radio frequency receiver and an audio system, and the event is related to an incoming communication received by the mobile communications device via the wireless network interface. The method may further include estimating, by the mobile communications device, an approximate speed of the mobile communications device, wherein the approximate speed generally corresponds to the speed of the moving vehicle. The method may also include determining, by the mobile communications device, that an approximate speed of the mobile communications device exceeds a predefined threshold speed, and transmitting, by the mobile communications device via a radio frequency transmitter, an audible alert that provides notification of the event in response to the mobile communications device determining that the approximate speed exceeds the defined threshold speed, such that the audible alert is receivable by the radio frequency receiver and playable by the audio system of the moving vehicle.

In another example, various aspects of this disclosure are directed to a computer-readable storage medium including instructions that, if executed, cause a mobile communications device having a processor to determine that an event has occurred, wherein the event is related to an incoming communication received by the mobile communications device when the mobile communications device is positioned in a vehicle. According to these aspects of the disclosure, the computer-readable storage medium also includes instructions that, if executed, cause the mobile communications device having the processor to determine that an approximate speed of the mobile communications device exceeds a predefined threshold speed. In accordance with these aspects of the disclosure, the computer-readable storage medium further includes instructions that, if executed, cause the mobile communications device having the processor to transmit, using a radio frequency transmitter, an audible alert that provides notification of the event in response to determining that the approximate speed of the mobile communications device exceeds the predefined threshold speed, such that the audible alert is receivable by a radio frequency receiver of the vehicle.

In a further example, various aspects of this disclosure are directed to a mobile communications device including one or more processors. In accordance with these aspects of the disclosure, the mobile communications device also includes an event module configured to determine that an event has occurred, where the event is related to an incoming communication received by the mobile communications device when the mobile communications device is positioned in a vehicle. According to these aspects of the disclosure, the mobile communications device also includes a speed comparison module configured to determine that an approximate speed of the mobile communications device exceeds a predefined threshold speed. In accordance with these aspects of the disclosure, the mobile communications device further includes an alert module configured to transmit using the means for transmitting a radio frequency transmission an audible alert that provides notification of the event in response to the determination that the approximate speed of the mobile communications device exceeds the defined threshold speed, such that the audible alert is receivable by a radio frequency receiver of the vehicle.

The details of one or more aspects of this disclosure are set forth in the accompanying drawings and the description below. Other features, objects, and advantages of the disclosure will be apparent from the description and drawings, and from the claims.

DETAILED DESCRIPTION

In general, this disclosure is directed to techniques that may provide a notification of an event to a user using a radio frequency transmitter of a mobile communications device. The event relates to an incoming communication received by the mobile communications device. The mobile communications device determines that the event has occurred and determines an approximate speed of the mobile communications device. The mobile communications device may compare the approximate speed to a predefined threshold speed, and if the approximate speed exceeds the predefined threshold speed, transmit using a radio frequency transmitter an audible alert that provides notification of the event to the user. In some examples, the mobile communications device may transmit the audible alert repeatedly for a predetermined length of time or until the mobile communications device detects a user interacting with the device.

In various examples, the audible alert may include a notification tone and/or an audio message. In some examples when the audible alert includes an audio message, the audio message may include caller identification information (e.g., caller phone number and/or approximate location), a name of a person from which the event originated (e.g., if the person is in a contact list stored on or accessible by the mobile communications device), and/or content of the event. Content of the event can include, for example, a body of a voicemail, or text of a SMS message, e-mail, or instant message that is converted to the audio message using a text-to-voice algorithm.

In some examples, prior to transmitting the audio message, the mobile communications device may determine that the content of the event includes at least one number. The at least one number may include, for example, an address, a telephone number, a personal identification number (PIN), an account number, a social security number, or the like. In some implementations, the mobile communications device may obfuscate the number when transmitting the audio message. For example, the mobile communications device may replace the number with an audio placeholder, which may be a hard pause, a tone, or a static noise, which renders the number unintelligible to a person listening to the audio message. This may provide privacy for the user of the mobile communications device or a person from whom the event originated, e.g., if a person other than the user of the mobile communications device hears the audio message.

Various aspects of this disclosure may provide one or more advantages. For example, at least one aspect of this disclosure may provide notification of a missed event without the user having to interact with the mobile communications device. As another example, at least one aspect of this disclosure may provide notification of a missed event from a mobile communications device to another device without additional, complex and/or costly devices. In some implementations, at least one aspect of this disclosure may promote privacy of user's data by determining an approximate speed of the mobile communications device before transmitting the notification using a radio frequency transmitter. This may reduce a risk of another device intercepting the radio frequency communication compared to an implementation where the mobile communications device transmits a notification using a radio frequency transmitter upon determining there has been a missed event. Additionally or alternatively, at least one aspect of this disclosure may obfuscate at least one number from the missed event prior to broadcasting the notification, which may reduce a risk of another device being used to hear the number, which may be, for example, a personal identification (PIN) number or an account number.

Figure 1:
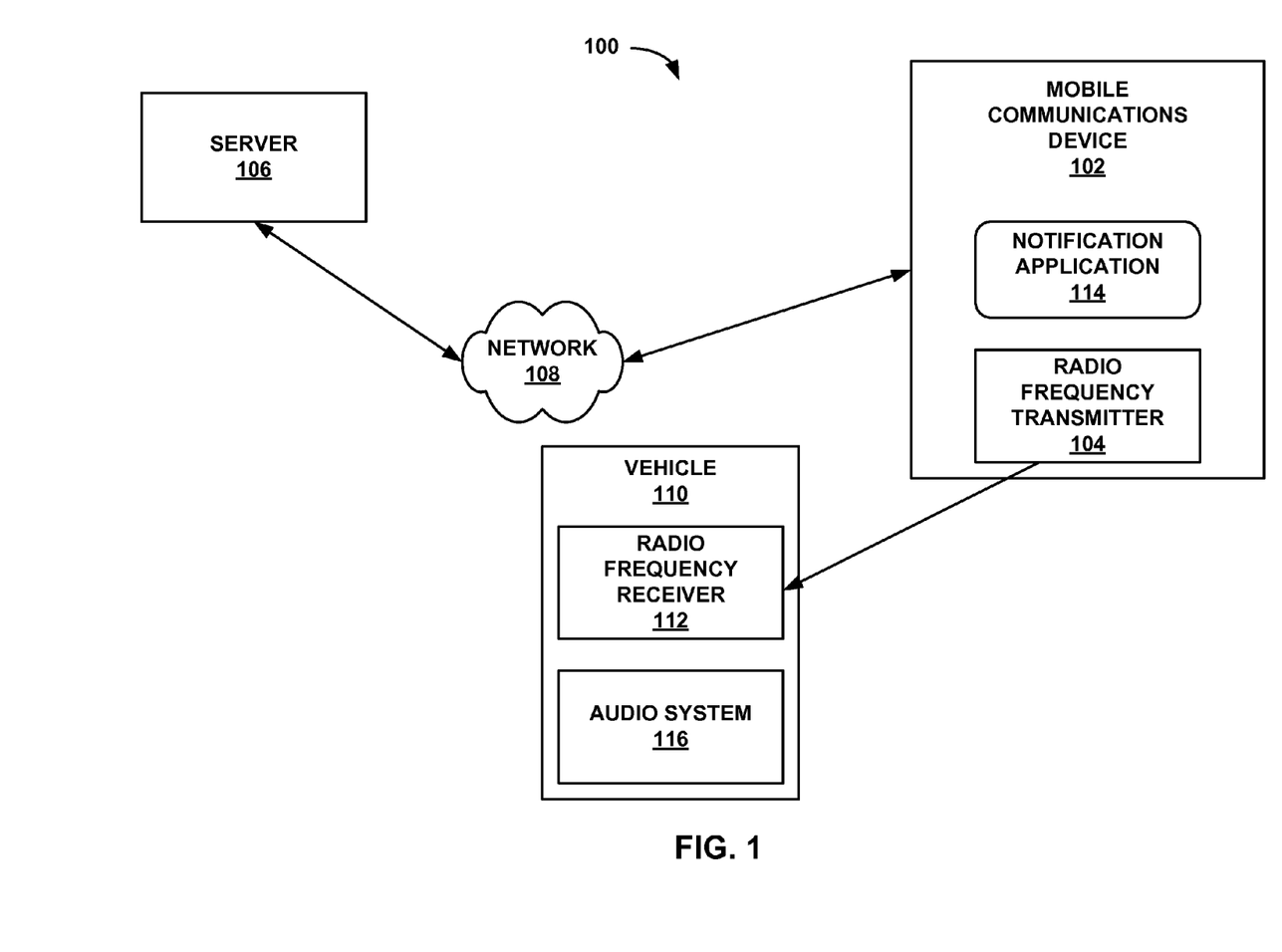
FIG. 1 is a block diagram illustrating an example system that includes a mobile communications device for providing a notification of an event via a radio frequency transmitter in accordance with one or more techniques of this disclosure.

FIG. 1 is a block diagram illustrating an example system 100 in accordance with one or more of the techniques of this disclosure. In the example of FIG. 1, system 100 includes a mobile communications device 102, at least one server 106 (server 106 for brevity), network 108, and vehicle 110. Network 108 allows access and interaction between computing devices and resources, such as networking resources (e.g., the Internet) and servers (e.g., server 106). Devices (e.g., mobile communications device 102) in system 100 may interact with other devices (e.g., server 106) and other resources via network 108.

Mobile communications device 102 may include, for example, a mobile telephone (e.g., a smartphone), a tablet, a personal digital assistant (PDA), or the like. Among other uses, mobile communications device 102 may allow a user to send and/or receive communications, such as telephone calls, voicemails, e-mails, SMS messages, instant messages, or social networking messages. For example, mobile communications device 102 may communicate (e.g., exchange data) with other devices, such as servers 106 or other communications devices using network 108. In some examples, network 108 includes a wireless network.

Mobile communications device 102 includes a radio frequency transmitter 104 and a notification application 114. Radio frequency transmitter 104 may include any device that is capable of generating and transmitting a radio frequency signal, such as a radio frequency signal within the FM band (e.g., between about 87.5 MHz and about 108 MHz) or a radio frequency signal within the AM band (e.g., between about 520 kHz and about 1,610 kHz). In some examples, radio frequency transmitter 104 may be a relatively low power transmitter, e.g., with a range of about 3 meters (about 10 feet) or less.

System 100 also includes a vehicle 110. Vehicle 110 may include, for example, an automobile, a motorcycle, a boat, or the like. Vehicle 110 includes a radio frequency receiver 112, which may be configured to receive radio frequency signals in at least one of an FM band of frequencies (between about 87.5 MHz and about 108 MHz) or an AM band of frequencies (between about 520 kHz and about 1,610 kHz). Vehicle 110 may also include an audio system 116. In some examples, audio system 116 may be configured to play (e.g., generate at least one sound) content received via radio frequency receiver 112.

In accordance with one or more of the techniques of this disclosure, mobile communications device 102 receives an event. The event may include an incoming communication from another device, such as server 106 or another communications device, using network 108. The event may not be the start of a new song played by the mobile communications device. In some examples, mobile communications device 102 determines that the incoming communication has been missed by the user of device 102, e.g., that the user has not interacted with device 102 to review the incoming communication or to answer the incoming communication. When mobile communications device 102 determines that the event has occurred (and, optionally, that the user has missed the event), notification application 114 of mobile communications device 102 proceeds to determine an approximate speed of the mobile communications device 102 (e.g., estimate an approximate speed of mobile communications device 102). For example, notification application 114 may determine an approximate speed of device 102 based on global positioning satellite (GPS) data or information about handoffs of the mobile communications device 102 between at least two cellular towers, as will be described in more detail below. In some examples, mobile communications device 102 may be located or positioned within vehicle 110, which may or may not be moving. Hence, in some examples, the approximate speed of mobile communications device 102 may generally correspond to the speed of vehicle 110, whether vehicle 110 is moving or not moving.

Notification application 114 then may compare the approximate speed of device 102 to a predefined threshold speed. The threshold speed may be based on, for example, a speed above which indicates the mobile phone is likely positioned on or in vehicle 110 and vehicle 110 is moving, and below which indicates the mobile phone is likely not in vehicle 110 (or vehicle 110 is not moving). When the approximate speed of device 102 exceeds the predefined threshold speed, notification application 114 may cause radio frequency transmitter 104 to transmit an audible alert that provides notification of the event. The audible alert may be transmitted by mobile communications device 102 in a format that is receivable by radio frequency receiver 112 of vehicle 110 and playable by audio system 116 of vehicle 110. In some examples, mobile communications device 102 may not be transmitting music via radio frequency transmitter 104 to radio frequency receiver 112 when the notification application 114 causes radio frequency transmitter 104 to transmit the audible alert that provides notification of the event.

The audible alert may include an audible tone or an audio message. In some examples, the audio message may include content of the event, such as content of the voicemail, e-mail, SMS message, instant message, or social network message. For example, notification application 114 may implement a text-to-voice algorithm to transform the text of an e-mail, SMS message, instant message, or social network message to an audible message. The audio message may additionally or alternatively include identification information about the originator of the event, such as caller identification information and/or contact information of a sender of the e-mail, SMS message, instant message, or social network message.

In some examples, notification application 114 may cause radio frequency transmitter 104 to transmit the audible alert repeatedly for a predetermined length of time or until notification application 114 determines that a user has interacted with the device. For example, notification application may cause radio frequency transmitter 104 to transmit the audible alert repeatedly for about 5 minutes, or another length of time sufficient to give the user time to tune radio frequency receiver 112 to the predetermined frequency on which radio frequency transmitter 104 is transmitting the audible alert.

In some implementations, notification application 114 may terminate transmission of the audible alert upon detecting the user interacting with device 102. For example, notification application 114 may determine that the user is interacting with device 102 using the output of one or more sensors of device 102, such as a proximity sensor, gyroscope, or accelerometer (not shown in FIG. 1). As another example, notification application 114 may determine that the user is interacting with device 102 by detecting user interaction with a user interface element of device 102, such as a power or lock/unlock button or a touchscreen of device 102. By terminating transmission of the audible alert upon detecting user interaction with mobile communications device 102, notification application 114 may reduce an amount of time during which the device 102 is transmitting the audible alert. In some examples, this may reduce a chance of another device (such as another radio frequency receiver not associated with vehicle 110) intercepting the transmission of the audible alert.

In some examples, notification application 114 implements additional or alternative techniques to protect privacy of the user and/or privacy of a person from whom the event originated. For example, notification application 114 may analyze the content of the event, such as the voicemail message, or body of the e-mail, SMS message, instant message, or social network message, to determine whether the content of the event includes at least one number, such as, e.g., a series of at least two numbers. When notification application 114 determines that the event includes at least one number, notification application 114 may broadcast the content of the event while obfuscating the at least one number, e.g., using an audio placeholder such as a hard pause, static noise, or tone. The audio placeholder renders the at least one number unintelligible to a person listening to the audible alert. This may protect the privacy of the user of mobile communications device 102 or the person sending the event. For example, the at least one number may include an address, a telephone number, a PIN, an account number, a social security number, or other personal information. In this way, notification application 114 may promote privacy of information within the content of the event while allowing the user of mobile communications device 102 to hear portions of the content of the event to determine the general nature of the event.

Figure 2:
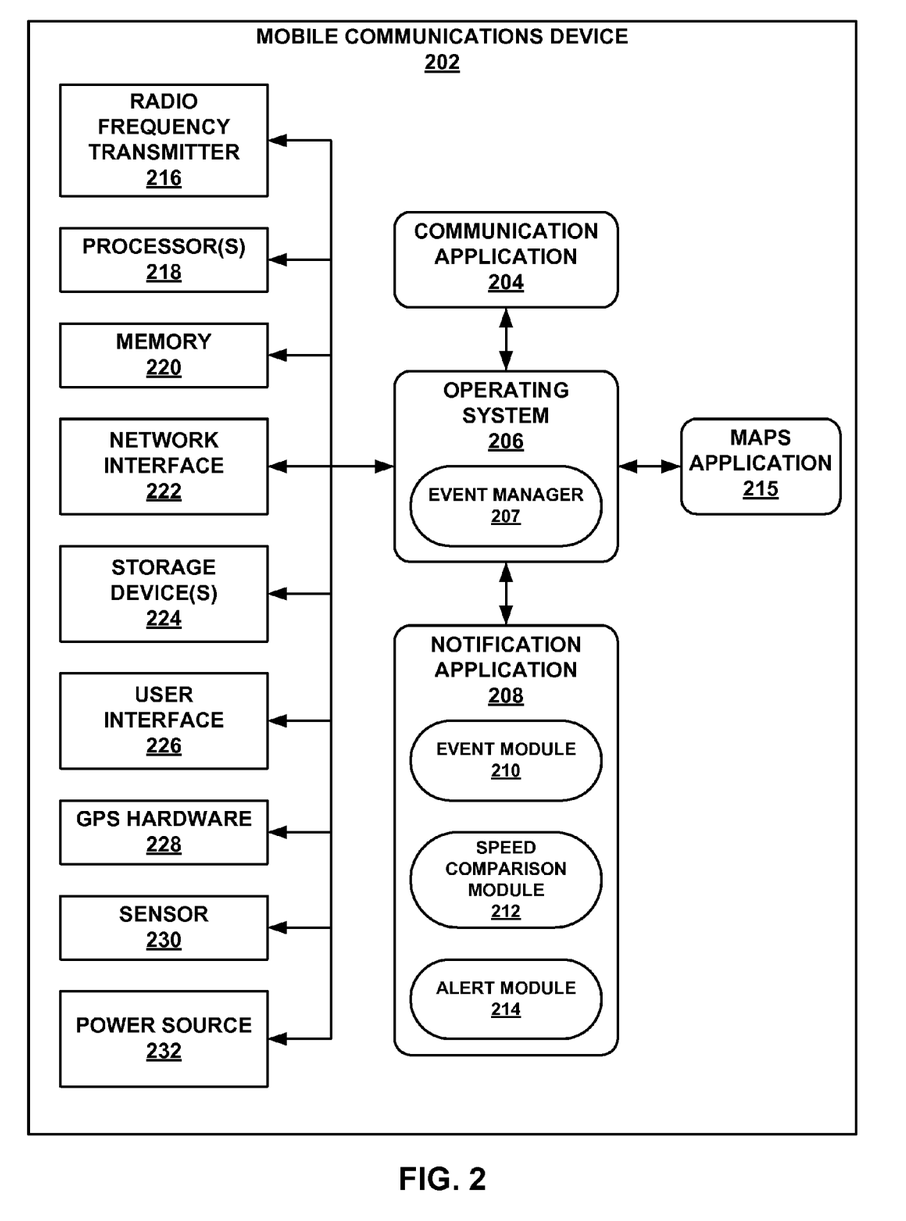
FIG. 2 is a block diagram illustrating further details of one example of the mobile communications device shown in FIG. 1.

FIG. 2 is a block diagram illustrating further details of one example of the mobile communications 102 device shown in FIG. 1. FIG. 2 illustrates only one particular example of mobile communications device 202, and many other examples of mobile communications device 202 may be used in other instances. As shown in the example of FIG. 2, mobile communications device 202 includes radio frequency transmitter 216, one or more processors 218, one or more memories 220, a network interface 222, one or more storage devices 224, user interface 226, GPS hardware 228, one or more sensor 230, and an optional power source 232. For example, if mobile communications device 202 comprises a mobile or portable device, power source 232 may include a battery or another source of energy, such as a capacitor (e.g., supercapacitor). Each of components 216, 218, 220, 222, 224, 226, 228, 230, and 232 may be interconnected via one or more busses for inter-component communications. Processors 218 may be configured to implement functionality and/or process instructions for execution within mobile communications device 202. Processors 218 may be capable of processing instructions stored in memory 220 or instructions stored on storage devices 224.

User interface 226 may include, for example, a monitor or other display device for presentation of visual information to a user of mobile communications device 202. User interface 226 may further include one or more input devices to enable a user to input data, such as a manual keyboard, mouse, touchpad, trackpad, etc. In some examples, user interface 226 may comprise a touchscreen, which may be used both to receive and process user input and also to display output information and application-specific options. User interface 226 may further include printers or other devices to output information. In various instances in the description contained herein, references made to user interface 226 may refer to portions of user interface 226 (e.g., keyboard, touch screen, mouse device) that provide user input functionality.

Memory 220 may be configured to store information within mobile communications device 202 during operation. Memory 220 may, in some examples, be described as a computer-readable storage medium. In some examples, memory 220 is a temporary memory, meaning that a primary purpose of memory 220 is not long-term storage. Memory 220 may also be described as a volatile memory, meaning that memory 220 does not maintain stored contents when the computer is turned off. Examples of volatile memories include random access memories (RAM), dynamic random access memories (DRAM), static random access memories (SRAM), and other forms of volatile memories known in the art. In some examples, memory 220 may be used to store program instructions for execution by processors 218. Memory 220 may be used by software or applications running on mobile communications device 202 (e.g., notification application 208) to temporarily store information during program execution.

Storage devices 224 may also include one or more computer-readable storage media. Storage devices 224 may be configured to store larger amounts of information than memory 220. Storage devices 224 may further be configured for long-term storage of information. In some examples, storage devices 224 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Mobile communications device 202 also includes network interface 222. Mobile communications device 202 may utilize network interface 222 to communicate with external devices (e.g., one or more servers, web servers) via one or more networks (e.g., network 108 of FIG. 1). Network interface 222 allows mobile communications device 202 to connect to a server to obtain information and/or data for one or more applications on mobile communications device 202, such as notification application 208. In some examples, network interface 222 includes a wireless network interface.

Mobile communications device 202 further includes radio frequency transmitter 216. Radio frequency transmitter 216 may include any device that is capable of generating and transmitting a radio frequency signal, such as a radio frequency signal within the FM band of frequencies (e.g., between about 87.5 MHz and about 108 MHz in North America) or a radio frequency signal within the AM band (e.g., between about 520 kHz and about 1,610 kHz in North America). In some examples, radio frequency transmitter 216 may be a relatively low power transmitter, e.g., with a range of about 3 meters (about 10 feet) or less.

In some examples, mobile communications device 202 also includes GPS hardware 228. GPS hardware may communicate with GPS satellites to determine an approximate geographical position of mobile communications device 202. Additionally, processor 218 may be operable to determine a speed and/or direction of mobile communications device 202 based on at least two approximate geographical positions of mobile communications device 202 and associated time values.

Mobile communications device 202 additionally includes sensor 230. In general, sensor 230 may include a device that is configured to produce an output that indicates a user is interacting with mobile communications device 202. For example, sensor 230 may include a power or lock/unlock button or switch located on device 202, an accelerometer, a gyroscope, a proximity sensor, or a capacitive or resistive touch sensor.

Mobile communications device 202 also includes communication application 204. Communication application 204 may be stored in memory 220 and/or storage devices 224, and may be operable by processors 218 to perform the functionality ascribed herein to communication application 204. In one example, communication application 204 may include applications available on mobile communications device 202 that a user of mobile communications device 202 may utilize for communicating. Communication application 204 may include, for example, voice- and/or text-based application, such as SMS messaging, e-mail, telephone capabilities, social networking, or the like. As noted above, communication application 204 may enable mobile communications device 202 to obtain information and/or data from external devices and networks, e.g., one or more servers 106 (FIG. 1).

Mobile communications device 202 also includes operating system 206. Operating system 206 may be stored in memory 220 and/or storage devices 224, and may be operable by processors 218 to perform the functionality ascribed herein to operating system 206. Operating system 206 may manage access to components 216, 218, 220, 222, 224, 226, 228, 230, and 232 by the applications executed or implemented by processors 218, such as communication application 204, maps application 215, and/or notification application 208. Operating system 206 may include an event manager or event handler 207, as described in further detail below.

Mobile communications device 202 additionally may include a maps application 215. Maps application 215 may be stored in memory 220 and/or storage devices 224, and may be operable by processors 218 to perform the functionality ascribed herein to operating system 206. Maps application 215 may display an approximate location, orientation, and/or speed of mobile communications device 202 within a virtual map of the geographic surroundings. In some examples, maps application 215 may determine an approximate speed of mobile communication device 202, e.g., based on information received using GPS hardware 228 and/or network interface 222.

Any applications implemented within or executed by mobile communications device 202 (e.g., notification application 208) may be implemented or contained within, operable by, executed by, and/or be operatively coupled to processors 218, memory 220, network interface 222, storage devices 224, and/or user interface 226.

Figure 3:
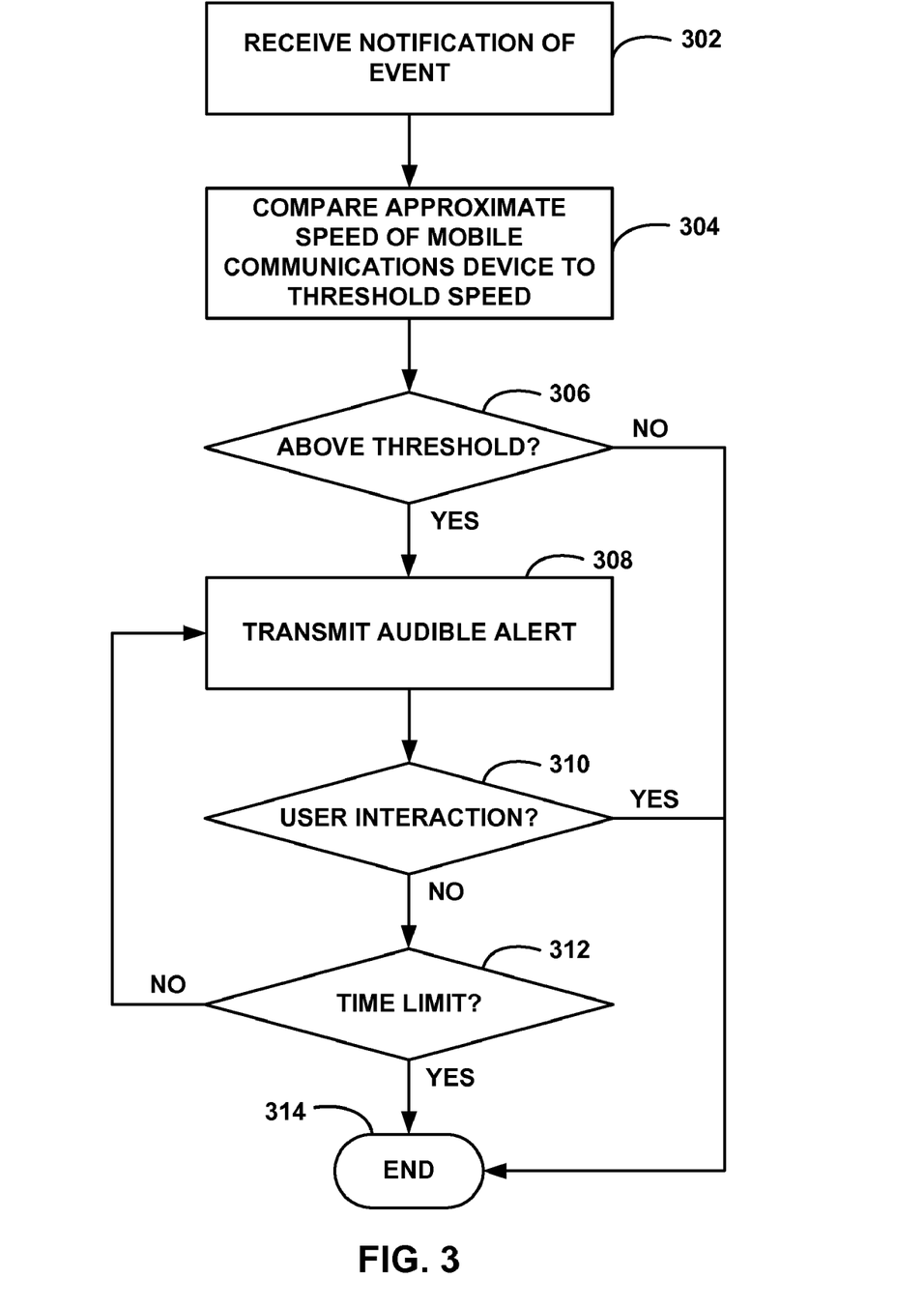
FIG. 3 is a flowchart illustrating an example method that may be performed by a mobile communications device to provide a notification of an event via a radio frequency transmitter in accordance with one or more techniques of this disclosure.

One example of notification application 208 is shown in FIG. 2. Notification application 208 may include an event module 210, a speed comparison module 212, and an alert module 214. Notification application 208 may be stored in memory 220 and/or storage devices 224, and may be operable by processors 218 to perform various tasks during execution. An example implementation of notification application 208 will be described with respect to FIG. 3, although other implementations are possible and fall within the scope of the claims. Similarly, although the method of FIG. 3 is described with reference to the system of FIGS. 1 and 2, the method may be implemented by other systems.

In one example, during implementation or execution of notification application 208, event module 210 may be operable by processors 218 to receive a notification of an event (302). As described above, the event may relate to an incoming communication received by mobile communications device 202 using network interface 222 and/or communication application 204. For example, event module 210 may register with event manager 207 of operating system 206. In this example, event module 210 may request event manager 207 to notify event module 210 when mobile communications device 202 receives a communication, e.g., using network interface 222 and/or communication application 204.

Subsequent to event module 210 registering with event manager 207, the event manager 207 notifies event module 210 each time mobile communications device 202 receives an incoming communication. Alternatively, the event manager 207 or another process of operating system 206 may first determine that the incoming communication has been missed by the user of mobile communications device 202, e.g., that the user has not interacted with device 202 to review the incoming communication or to answer the incoming communication. Once event manager 207 or another process of operating system 206 determines that the user has missed the event, the event manager 207 may notify event module 210. Upon receiving the notification of the incoming communication (or missed communication) from event manager 207, event module 210 may initiate speed comparison module 212 of notification application 208.

Speed comparison module 212 may be operable by processors 218 to compare an approximate speed of mobile communications device 202 to a defined threshold speed (304). In some examples, speed comparison module 212 retrieves an approximate speed of mobile communications device 202 from another application or from operating system 206. For example, the approximate speed of mobile communications device 202 may be determined (e.g., estimated) by maps application 215, a navigation application (which may be separate from or integral with maps application 215), or the like (not shown in FIG. 2), and speed comparison module 212 may request the approximate speed from that application. In some implementations, maps application 215 or the operating system 206 may determine (e.g., estimate) the approximate speed of the device 202 using, for example, GPS data received using GPS hardware 228 or cell tower handoff information received using network interface 222. In some examples, GPS data may permit determination (e.g., estimation) of a more accurate speed of mobile communications device 202 than cell tower handoff information. However, acquiring GPS data may require mobile communications device 202 to use more power, e.g., to enable the GPS hardware 228, which may adversely impact battery life of mobile communications device 202. In some examples, determining (e.g., estimating) the approximate speed of mobile communications device 202 based on cell tower handoff information may provide a sufficiently accurate speed of device 202 while using less power than acquiring GPS data.

Maps application 215 or operating system 206 may determine (e.g., estimate) the approximate speed from cell tower handoff information in some examples. For example, when mobile communications device 202 connects to a cell tower using network interface 222, processors 218 may receive from the cell tower location information (e.g., latitude and longitude) for the cell tower. Processors 218 may associate the cell tower location information with time data indicating the time at which processors 218 received the cell tower location information and store the cell tower location information and time data in memory 220 and/or storage devices 224.

As mobile communications device 202 moves, e.g., in a vehicle 110 (FIG. 1), mobile communications device 202 may connect to a second cell tower using network interface 222. When mobile communications device 202 connects to the second cell tower, processors 218 may receive location information from the second cell tower. Processors 218 may associate the second cell tower location information with time data indicating the time at which processors 218 received the second cell tower location information and store the second cell tower location information and time data in memory 220 and/or storage devices 224. Processors 218 may then determine (e.g., estimate) an approximate speed of mobile communications device 202 using the cell tower location information and the associated time data.

In some implementations, instead of retrieving the approximate speed of mobile communications device 202 from maps application 215 or operating system 206, speed comparison module 212 is additionally operable by processors 218 to determine (e.g., estimate) the approximate speed of mobile communications device 202. Speed comparison module 212 may be operable by processors 218 to determine (e.g., estimate) the approximate speed of mobile communications device 202 based on, for example, GPS data received using GPS hardware 228 or cell tower handoff information received using network interface 222, as described above.

Once speed comparison module 212 retrieves or determines the approximate speed of mobile communications device 202, speed comparison module 212 compares the approximate speed of mobile communications device 202 to a predefined threshold speed (304). The predefined threshold speed may be based on a speed above which suggests that mobile communications device 202 is positioned in or on a vehicle 110 (FIG. 1) that is moving and below which suggests that mobile communications device 202 is not positioned in or on vehicle 110 (or is located in a vehicle 110 that is not moving). For example, the predefined threshold speed may be about 32 kilometers per hour (km/h) (about 20 miles per hour (mph)). In some examples, the threshold speed is a single, predefined value included in notification application 208. In other examples, the threshold speed may be defined by the user of mobile communications device 202, e.g., through interaction with notification application 208. For example, notification application 208 may include a list of threshold speed values from which the user may select, such as 16 km/h (about 10 mph), 24 km/h (about 15 mph), 32 km/h (about 20 mph), or 40 km/h (about 25 mph). As another example, notification application 208 may enable the user to define any speed value for use as the threshold speed.

When speed comparison module 212 determines the approximate speed of mobile communications device 202 is below the defined threshold speed (the "NO" branch of decision block 306), the technique ends (314) and notification application 208 enters a standby state in which event module 210 waits to receive a notification of an event from event manager 207. However, when speed comparison module 212 determines the approximate speed of mobile communications device 202 is above the defined threshold speed (the "YES" branch of decision block 306), speed comparison module 212 initiates alert module 214 of notification application 208.

Alert module 214 generates and transmits, using radio frequency transmitter 216, an audible alert of the event (308). Alert module 214 may generate and transmit the audible alert via radio frequency transmitter 216 in a format that is receivable by radio frequency receiver 112 of vehicle 110 and playable by audio system 116 of vehicle 110. In some examples, the audible alert may include an audible tone. Additionally or alternatively, the audible alert may include an audio message. The audio message may include, for example, identification information about a person from whom the event (e.g., incoming communication) originated. For example, when the event is a missed telephone call, the identification information may include caller identification information, such as a phone number and/or an approximate geographic location from which the call was made. As another example, when the event is an incoming e-mail, the identification information may include an email address from which the e-mail originated. When the event is an incoming SMS message, the identification information may include a telephone number from which the SMS message originated. When the event is an incoming social network message, the identification information may include a username from which the social network message originated. In examples in which the event comprises a text-based communication, the alert module 214 may convert the identification information from alphanumeric text to audio using a text-to-voice algorithm.

In any of these examples, the identification information may optionally include information gathered from a contact list stored in memory 220, storage devices 224, or accessed using network interface 222. For example, the contact information may associate a name of a person with one or more e-mail addresses, telephone numbers, social network usernames, or the like. Alert module 214 may receive the contact information from another application, such as communication application 204, or operating system 206, and may transmit at least part of the contact information as part of the audio message.

The audio message may additionally or alternatively include content of the event, such as content of the voicemail, e-mail, SMS message, instant message, or social network message. When the event includes a voicemail, alert module 214 may transmit the audio content of the voicemail as part of the audio message. When the event includes a text-based communication, such as an e-mail, SMS message, instant message, or social network message, the alert module 214 may implement a text-to-voice algorithm to generate the audio message from the text of the e-mail, SMS message, instant message, or social network message.

In some examples when alert module 214 generates an audio message that includes content of the event, alert module 214 may implement an algorithm that identifies at least one number within the content of the event and obfuscates the at least one number. In some examples, a number may be sensitive or personal information, such as a telephone number, address, PIN, social security number, or account number. To reduce a chance that another person (e.g., other than the user of mobile communications device 202) hears the at least one number, for example, using a radio frequency receiver not associated with vehicle 110 (FIG. 1), alert module 214 may identify at least one number within the content of the event and not transmit the number as part of the audio message or may replace the number with an audio placeholder.

For example, alert module 214 may implement a voice-recognition algorithm that inspects a voicemail and identifies any numbers within the voicemail. When playing back the voicemail as part of the audio message, alert module 214 may not transmit the numbers within the voicemail, or may replace the numbers with a beep, static noise, hard pause, or the like, which obfuscates the number(s), e.g., renders the numbers unintelligible to a person listening to the audio message.

As another example, alert module 214 may implement a text-recognition algorithm that inspects a text-based communication such e-mail, SMS message, instant message, or social network message and identifies any numbers within the text-based communication. When converting the text-based communication to an audio alert using a text-to-voice algorithm, alert module 214 may not transmit the numbers within the voicemail, or may replace the numbers with a beep, static noise, hard pause, or the like, which obfuscates the number(s), e.g., renders the numbers unintelligible to a person listening to the audio message.

Alert module 214 transmits the audio message using radio frequency transmitter 216 on at least one defined frequency. In some examples, the frequency may be predefined and stored within alert module 214. The user of mobile communications device 202 may access a user interface screen of notification application 208 to identify the predefined frequency, and thus may be aware of which frequency to tune radio frequency receiver 112 of vehicle 100 to hear the audio message. In some examples, notification application 208 may allow the user of mobile communications device 202 to select from among at least two frequencies, e.g., based on a frequency that the user believes or expects to have little radio frequency interference in the location(s) at which the user will be using mobile communications device 202. As described above, the frequency at which alert module 214 causes radio frequency transmitter 216 to transmit the audible alert may be within, for example, the FM band of frequencies or the AM band of frequencies.

In some examples, instead of transmitting the audible alert on one frequency, the alert module 214 can cause radio frequency transmitter 216 to transmit the audible alert on multiple frequencies. For example, alert module 214 may store at least two predefined frequencies on which radio frequency transmitter 216 will transmit the audible alert. The at least two predefined frequencies may be sequential frequencies (e.g., adjacent to each other within a frequency band) or may be separated by one or more frequencies (between adjacent broadcast frequencies). As another example, notification application 208 may allow the user of mobile communications device 202 to input or select at least two frequencies from among a plurality of frequencies, e.g., using a list of available frequencies.

In some examples, alert module 214 may generate and transmit, using radio frequency transmitter 216, two separate audible alerts. For example, alert module 214 may generate a first audible alert that includes an audible tone and a second audible alert that includes an audio message. In some implementations, alert module 214 causes radio frequency transmitter 216 to transmit the first audible alert on a first frequency (or a first set of frequencies) and causes radio frequency transmitter 216 to transmit the second audible alert on a second frequency (or second set of frequencies) that is different that the first frequency.

For example, notification application 208 may include a user interface screen that allows a user of mobile communications device 202 to select the first frequency from among a plurality of frequencies or define the first frequency on which alert module 214 will transmit the first audible alert. The first frequency may be a frequency that the user tunes to at least some times (e.g., a radio station to which the user listens). Alert module 214 then may cause radio frequency transmitter 216 to transmit the first audible alert on the first frequency. Notification application 208 also may include a user interface screen that allows a user of mobile communications device 202 to select the second frequency from among a plurality of frequencies or define the second frequency on which alert module 214 will transmit the second audible alert. The second frequency may be a frequency that the user expects will suffer little or no radio frequency interference at the location at which the user will be using mobile communications device 202.

In this way, the first audible alert may be receivable by radio frequency receiver 112 and heard by the user using audio system 116 (FIG. 1) when the user is tuning into the first frequency. When the user hears the first audible alert, the user may understand to tune radio frequency receiver 112 to the second frequency, on which the second audible alert is being transmitted by radio frequency transmitter 216. The user then hears the second audible alert via audio system 116, which includes the audio message.

In some alternative examples, alert module 214 causes radio frequency transmitter 216 to transmit a first audible alert that includes an audio message on a first frequency (or a first set of frequencies) and causes radio frequency transmitter 216 to transmit a second audible alert that includes the audio message on a second frequency (or second set of frequencies) that is different that the first frequency (or first set of frequencies).

Regardless of the nature of the audible alert, or whether the audible alert includes a first alert and a second alert, alert module 214 may cause radio frequency transmitter to transmit the audible alert repeatedly. In some examples, alert module 214 optionally periodically determines whether the user has interacted with mobile communications device 202 (310). For example, alert module 214 may register with event manager 207 of operating system 206. In this example, alert module 214 may request event manager 207 to notify alert module 214 when sensor 230 of mobile communications device 202 senses an event that indicates a user is interacting with device 202. For example, the user may interact with the device by actuating a power or lock/unlock button or switch located on device 202. Sensor 230 may sense this interaction and event manager 207 may notify alert module 214 of the interaction. As other examples, sensor 230 may include an accelerometer, a gyroscope, a proximity sensor, or a capacitive or resistive touch sensor.

In any case, when alert module 214 receives from event manager 207 a notification of a sensed event indicating the user is interacting or has interacted with device 202 (the "YES" branch of decision block 310), alert module 214 may cease transmitting the audible alert and the process may end (314). However, when alert module 214 does not receive a notification of a sensed event indicating the user is interacting or has interacted with device 202 (the "NO" branch of decision block 310), alert module 214 continues to generate the audible alert and cause radio frequency transmitter 216 to transmit the audible alert (308).

Optionally, in some examples, alert module 214 may cause radio frequency transmitter 216 to transmit the audible alert for a predetermined length of time. The predetermined length of time may be predefined and stored within notification application 208, or notification application 208 may include at least one user interface screen that allows a user to define a length of time or select a length of time from a list of lengths of time stored in notification application 208. For example, the length of time may be about five (5) minutes. When alert module 214 causes radio frequency transmitter 216 to transmit the audible alert for a predetermined length of time, alert module 214 may periodically determine whether the length of time has passed (312). As shown in FIG. 3, when alert module 214 determines that the length of time has passed (the "YES" branch of decision block 312), the process ends (314). However, alert module 214 determines that the length of time has not passed (the "NO" branch of decision block 312), alert module 214 continues to generate the audible alert and cause radio frequency transmitter 216 to transmit the audible alert (308).

As shown in FIG. 3, in some examples, alert module 214 may both periodically determine whether a user has interacted with mobile communications device 202 (310) and periodically determine whether a defined length of time has passed (312). In other example, alert module 214 may perform only one of these checks instead of both checks.

Although FIGS. 2 and 3 describe notification application 208 as a separate application implemented or operable by processors 218, in some examples, the functionality of notification application 208 may be implemented within another application, such as communication application 214 or may be implemented within operating system 206.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various implementations of the disclosure have been described. These and other implementations are within the scope of the following claims.

The invention claimed is:

1. A method performed by a mobile communications device having a processor, a memory, a wireless network interface, and a radio frequency transmitter, the method comprising:
 determining, by the mobile communications device, that an event has occurred, wherein:
  the mobile communications device is positioned within a moving vehicle having a radio frequency receiver and an audio system, and
  the event is related to an incoming communication received by the mobile communications device via the wireless network interface;
 in response to the mobile communications device determining that the event has occurred, estimating, by the mobile communications device, an approximate speed of the mobile communications device, wherein the approximate speed generally corresponds to the speed of the moving vehicle;
 determining, by the mobile communications device, that the approximate speed of the mobile communications device exceeds a predefined threshold speed; and
 in response to the mobile communications device determining that the approximate speed exceeds the predefined threshold speed, transmitting, by the mobile communications device via the radio frequency transmitter, an audible tone that provides notification of the event on a first predetermined frequency and an audio message comprising at least some content of the event on a second, different predetermined frequency, such that the audible tone and the audio message are receivable by the radio frequency receiver and playable by the audio system of the moving vehicle.

2. The method of claim 1, wherein estimating, by the mobile communications device in response to the mobile communications device determining that the event has occurred, the approximate speed of the mobile communications device comprises estimating, by the mobile communications device, the approximate speed of the mobile communications device using global positioning satellite (GPS) data.

3. The method of claim 1, wherein estimating, by the mobile communications device in response to the mobile communications device determining that the event has occurred, the approximate speed of the mobile communications device comprises estimating, by the mobile communications device, the approximate speed of the mobile communications device using cell tower handshake information.

4. The method of claim 1, wherein transmitting, by the mobile communications device via the radio frequency transmitter in response to the mobile communications device determining that the approximate speed exceeds the predefined threshold speed, the audible tone that provides notification of the event on the first predetermined frequency and the audio message comprising the at least some content of the event on the second, different predetermined frequency comprises:
    transmitting, by the mobile communications device via the radio frequency transmitter in response to the mobile communications device determining that the approximate speed exceeds the predefined threshold speed, the audible tone on the first predetermined frequency between about 87.5 MHz and about 108 MHz or between about 520 kHz and about 1610 kHz and
    transmitting the audio message on the second, different predetermined frequency between about 87.5 MHz and about 108 MHz or between about 520 kHz and about 1610 kHz.

5. The method of claim 1, wherein transmitting, by the mobile communications device via the radio frequency transmitter in response to the mobile communications device determining that the approximate speed exceeds the predefined threshold speed, the audible tone that provides notification of the event on the first predetermined frequency and the audio message comprising the at least some content of the event on the second, different predetermined frequency comprises transmitting, by the mobile communications device via the radio frequency transmitter in response to the mobile communications device determining that the approximate speed exceeds the predefined threshold speed, the audible tone and the audio message repeatedly for a predetermined length of time.

6. The method of claim 1, wherein transmitting, by the mobile communications device via the radio frequency transmitter in response to the mobile communications device determining that the approximate speed exceeds the predefined threshold speed, the audible tone that provides notification of the event on the first predetermined frequency and the audio message comprising the at least some content of the event on the second, different predetermined frequency comprises transmitting, by the mobile communications device via the radio frequency transmitter in response to the mobile communications device determining that the approximate speed exceeds the predefined threshold speed, the audible tone and the audio message repeatedly until the mobile communications device detects a user interacting with the mobile communications device.

7. The method of claim 1, wherein the audio message further comprises caller identification information.

8. The method of claim 1, wherein the audio message further comprises a name of a person from whom the event originated.

9. The method of claim 1, wherein the at least some content of the event comprises at least one of a body of a voicemail and text of a short message service (SMS) message, e-mail, or instant message that is converted to the audio message using a text-to-voice algorithm.

10. The method of claim 9, wherein transmitting, by the mobile communications device via the radio frequency transmitter in response to the mobile communications device determining that the approximate speed exceeds the predefined threshold speed, the audible tone that provides notification of the event of the first predetermined frequency and the audio message comprising the at least some content of the event on the second, different predetermined frequency comprises:
    detecting a number in the at least some content of the event; and
    obfuscating the number when transmitting, by the mobile communications device via the radio frequency transmitter, the audio message comprising the at least some content of the event on the second, different predetermined frequency.

11. The method of claim 10, wherein obfuscating the number when transmitting, by the mobile communications device via the radio frequency transmitter, the audio message comprising the at least some content of the event on the second, different predetermined frequency comprises replacing the number with an audio placeholder when transmitting, by the mobile communications device via the radio frequency transmitter, the audio message comprising the at least some content of the event on the second, different predetermined frequency.

12. The method of claim 1, wherein the predefined threshold speed is set by the mobile communications device.

13. The method of claim 1, wherein the predefined threshold speed is set by a user using the mobile communications device.

14. The method of claim 1, wherein determining, by the mobile communications device, that the event has occurred comprises determining, by the mobile communications device, that a call, a voicemail, an e-mail, a short message service (SMS) message, or an instant message has been received by the mobile communications device.

15. The method of claim 1, wherein determining, by the mobile communications device, that the event has occurred comprises determining, by the mobile communications device, that the mobile communications device has received an incoming communication that has not been reviewed by a user of the mobile communications device.

16. A tangible computer-readable storage medium comprising instructions that, if executed, cause a mobile communications device having a processor to:
    determine that an event has occurred, wherein the event is related to an incoming communication received by the mobile communications device when the mobile communications device is positioned in a vehicle;
    determine that an approximate speed of the mobile communications device exceeds a predefined threshold speed in response to determining that the event has occurred;

transmit, using a radio frequency transmitter in response to the mobile communications device determining that the approximate speed exceeds the predefined threshold speed, an audible tone that provides notification of the event on a first predetermined frequency and an audio message comprising at least some content of the event on a second, different predetermined frequency, such that the audible tone and the audio message are receivable by a radio frequency receiver of the vehicle.

17. A mobile communications device comprising:
one or more processors;
an event module configured to determine that an event has occurred, wherein the event is related to an incoming communication received by the mobile communications device when the mobile communications device is positioned in a vehicle;
a speed comparison module configured to determine that an approximate speed of the mobile communications device exceeds a predefined threshold speed in response to determining that the event has occurred; and
an alert module configured to transmit, using a radio frequency transmitter in response to the mobile communications device determining that the approximate speed exceeds the predefined threshold speed, an audible tone that provides notification of the event on a first predetermined frequency and an audio message comprising at least some content of the event on a second, different predetermined frequency, such that the audible tone and the audio message are receivable by a radio frequency receiver of the vehicle.

* * * * *